(12) United States Patent
Koik et al.

(10) Patent No.: US 9,266,174 B2
(45) Date of Patent: Feb. 23, 2016

(54) CUTTING TOOL

(71) Applicant: sp3 Cutting Tools, Inc., Decatur, IN (US)

(72) Inventors: Erik Koik, Urbana, OH (US); Kirk Bennett, Ossian, IN (US)

(73) Assignee: sp3 Cutting Tools, Inc., Decatur, IN (US)

( * ) Notice: Subject to any disclaimer, the term of this patent is extended or adjusted under 35 U.S.C. 154(b) by 159 days.

(21) Appl. No.: 13/913,802

(22) Filed: Jun. 10, 2013

(65) Prior Publication Data

US 2014/0363243 A1 Dec. 11, 2014

(51) Int. Cl.
| | |
|---|---|
| *B23C 5/18* | (2006.01) |
| *B23C 5/08* | (2006.01) |
| *B23C 5/16* | (2006.01) |
| *B23C 5/20* | (2006.01) |
| *B23C 5/22* | (2006.01) |

(52) U.S. Cl.
CPC . *B23C 5/165* (2013.01); *B23C 5/18* (2013.01); *B23C 5/20* (2013.01); *B23C 5/2204* (2013.01); *B23C 2210/48* (2013.01); *B23C 2210/483* (2013.01); *B23C 2240/08* (2013.01); *Y10T 407/1942* (2015.01); *Y10T 407/22* (2015.01); *Y10T 407/2268* (2015.01)

(58) Field of Classification Search
CPC ............ B23C 5/165; B23C 5/20; B23C 5/06; B23C 5/08; B23C 5/2234; B23C 5/2226; Y10T 407/1942

USPC .................... 407/46, 34, 40, 101, 51, 56, 100
See application file for complete search history.

(56) References Cited

U.S. PATENT DOCUMENTS

| | | | | |
|---|---|---|---|---|
| 1,015,409 | A * | 1/1912 | Taylor | 407/46 |
| 3,815,454 | A * | 6/1974 | Knott | 82/158 |
| 4,616,965 | A | 10/1986 | Anderson et al. | |
| 5,788,426 | A | 8/1998 | Daniels | |
| 6,062,775 | A | 5/2000 | Satran et al. | |
| 6,299,389 | B1 * | 10/2001 | Barazani | 407/110 |
| 6,334,740 | B1 * | 1/2002 | Qvarth | 407/36 |
| 6,488,456 | B1 | 12/2002 | Satran et al. | |
| 6,571,451 | B2 * | 6/2003 | Satran et al. | 29/447 |
| 7,086,812 | B2 | 8/2006 | Gamble et al. | |
| 7,927,047 | B2 | 4/2011 | Lysobey et al. | |
| 2001/0002972 | A1 | 6/2001 | Satran et al. | |
| 2002/0053266 | A1* | 5/2002 | Enquist | 82/1.11 |
| 2004/0131432 | A1* | 7/2004 | Riviere | 407/40 |
| 2004/0161311 | A1* | 8/2004 | Satran et al. | 407/46 |
| 2004/0191008 | A1* | 9/2004 | Noggle et al. | 407/46 |
| 2004/0191009 | A1* | 9/2004 | Toyose | 407/46 |
| 2010/0254774 | A1* | 10/2010 | Hecht | 407/101 |
| 2013/0034393 | A1* | 2/2013 | Hecht | 407/101 |

* cited by examiner

*Primary Examiner* — Sunil K Singh
*Assistant Examiner* — Sara Addisu
(74) *Attorney, Agent, or Firm* — Fraser Clemens Martin & Miller LLC; James D. Miller

(57) ABSTRACT

A cutting tool including an annular cutter body having at least one V-shaped pocket formed therein and a cutting tool cartridge configured to be received in the at least one pocket of the cutter body. The cutting tool cartridge including a main body. The main body includes a cutting head having a cutting chip control portion and a pocket configured to receive a cutting insert.

20 Claims, 2 Drawing Sheets ic
CUTTING TOOL

FIELD OF THE INVENTION

The present invention relates generally to a cutting tool and, more particularly, to a cutting tool including a cutter body having a plurality of cutting tool cartridges coupled thereto.

BACKGROUND OF THE INVENTION

Conventional cutting tools include an annular cutter body having one or more circumferentially spaced recesses known as "pockets" formed therein. Each of the pockets is configured to receive a cutting tool cartridge therein. The cutting tool cartridge has a shape and configuration to be secured within the pocket of the cutter body. Typically, the cutting tool cartridges are secured into the respective pocket by means of a clamping screw, which extends through a hole in the cutting tool cartridge. The cutting tool cartridge is configured for retention of a cutting insert for removing material from a workpiece.

Presently, each of the cutting tool cartridges is configured for retention of a specific cutting insert having a certain depth of cut. Accordingly, the prior art cutting tools require numerous cutting tool cartridges when various depths of cut are desired. Furthermore, the prior art cutting tool cartridges do not positively locate the cutting insert. Thus, the position of the cutting insert is not controllable during a brazing of the cutting insert to the cutting tool cartridge, resulting in misalignment of the cutting insert and an undesirable machining of the workpiece.

Accordingly, it would be desirable to produce a cutting tool including a cutter body provided with a plurality of cartridges, wherein each of the cartridges is economical to manufacture, easy to machine, and includes a universal pocket which is capable of retaining a variety of cutting inserts having differing depths of cut, as well as militates against wear and damage to the cutter body.

SUMMARY OF THE INVENTION

In concordance and agreement with the present disclosure, a cutting tool including a cutter body provided with a plurality of cartridges, wherein each of the cartridges is economical to manufacture, easy to machine, and includes a universal pocket which is capable of retaining a variety of cutting inserts having differing depths of cut, as well as militates against wear and damage to the cutter body, has surprisingly been discovered.

In one embodiment, the cutting tool cartridge, comprises: a main body including a cutting head having a pocket configured to receive a cutting insert, wherein the pocket includes a shoulder and a recess formed between the shoulder and a substantially planar surface to position the cutting insert relative to the cutting tool cartridge.

In another embodiment, the cutting tool, comprises: a cutter body including at least one pocket formed therein; and a cutting tool cartridge configured to be received in the at least one pocket of the cutter body, the cutting tool cartridge including a main body, wherein the main body includes a cutting head having a pocket configured to receive a cutting insert, wherein the pocket includes a shoulder and a recess formed between the shoulder and a substantially planar surface to position the cutting insert relative to the cutting tool cartridge.

In yet a further embodiment, the cutting tool, comprises: a cutter body including at least one pocket formed therein; and a cutting tool cartridge configured to be received in the at least one pocket of the cutter body, the cutting tool cartridge including a main body, wherein the main body includes a cutting head having a cutting chip control portion and a pocket configured to receive a cutting insert.

BRIEF DESCRIPTION OF THE DRAWINGS

The above, as well as other objects and advantages of the invention, will become readily apparent to those skilled in the art from a reading of the following detailed description of the invention when considered in the light of the accompanying drawings in which.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

Figure 1:
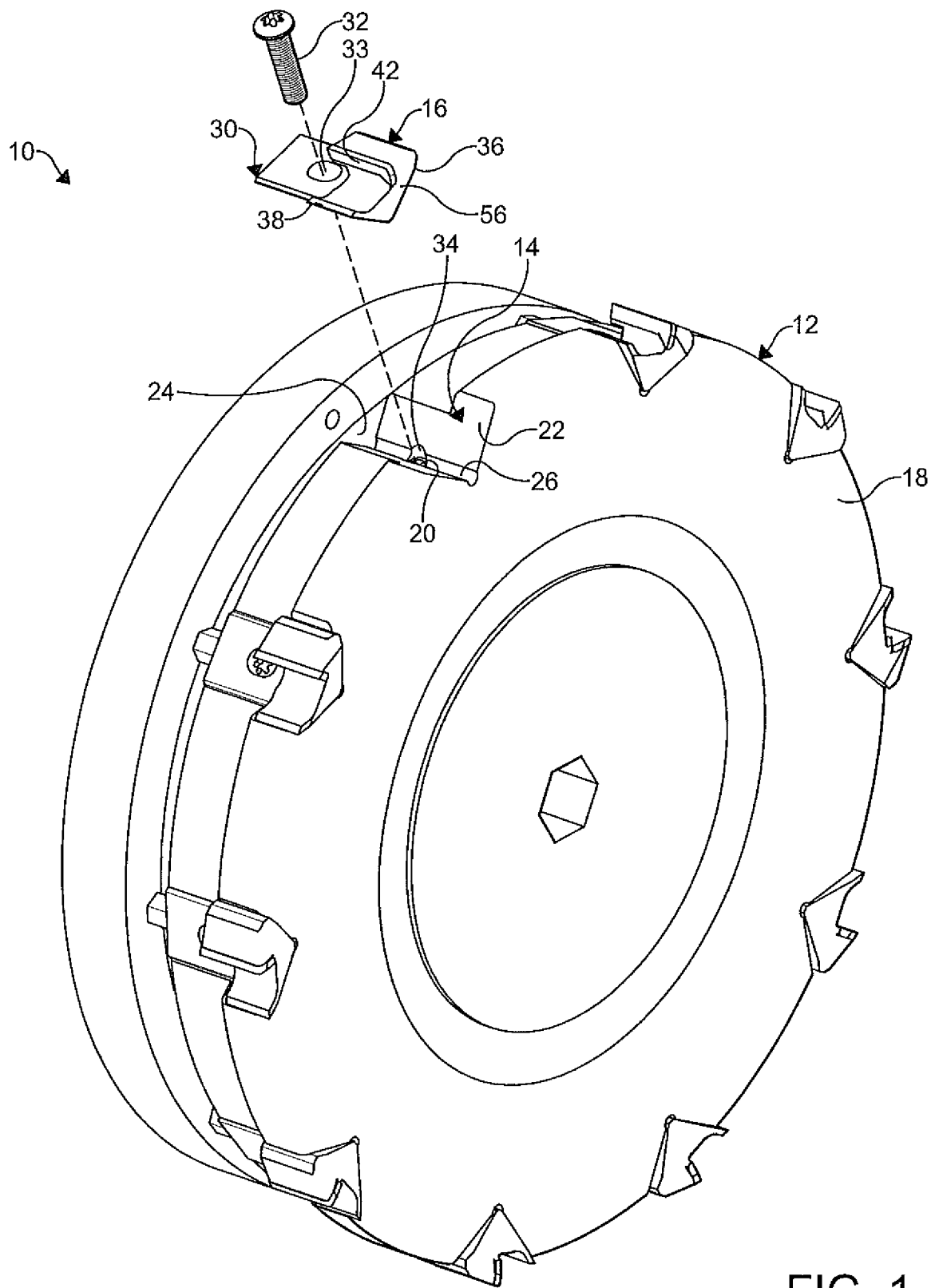
FIG. 1 is a front perspective view of a portion of a cutting tool including a cutter body provided with a plurality of cartridges according to the present invention, showing one of the cartridges exploded from the cutter body.

FIG. 1 shows a cutting tool 10 according to the present invention. The cutting tool 10 includes an annular cutter body 12 and one or more circumferentially spaced recesses known as "pockets" 14 formed therein. Each of the pockets 14 is configured to receive a cartridge 16 therein. A longitudinal axis of each of the pockets 14 is substantially parallel with a central, longitudinal axis of the cutter body 12. The pockets 14 shown are equidistantly spaced at about thirty-six degrees with respect to each other and proximate a cutting end 18 of the cutter body 12. It is understood, however, that the pockets 14 can be spaced with respect to each other at any desired interval and formed at any suitable location on the cutting end 18 of the cutter body 12. Each of the pockets 14 is generally V-shaped having side walls 20, 22 angled relative to one another, a back wall 24 perpendicular to the side walls 20, 22 and the longitudinal axis of the pockets 14, and a clearance portion 26 formed at a nadir of the pocket 14. The V-shaped pockets 14 permit the cartridges 16 received therein to be both right handed and left handed.

In certain embodiments, each of the cartridges 16 is substantially identical to the other cartridges 16. It is understood that any of the cartridges 16 can differ from the other cartridges 16 if desired. As illustrated, the cartridge 16 has a main body 30. The main body 30 has a generally triangular cross-sectional shape which permits the cartridge 16 to firmly seat and align within the respective one of the pockets 14. Each cartridge 16 is mounted to the respective one of the pockets 14 by one or more fasteners 32 shown in FIG. 1. The fastener 32 may be of the type having a head adapted to receive an allen wrench, for example. A threaded shank of the fastener 32 is received through an aperture 33 formed in the cartridge 16 and into an internally threaded bore 34 formed in the cutter body 12, which extends radially inwardly from each of the V-shaped pockets 14. In certain embodiments, each of the cartridges 16 may include a rod (not shown) extending laterally outwardly from the main body 30. The rod is configured to be received in an aperture (not shown) formed in the back wall 24 of the pocket 14 to further secure the cartridge 16 to the cutter body 12.

Figure 2:
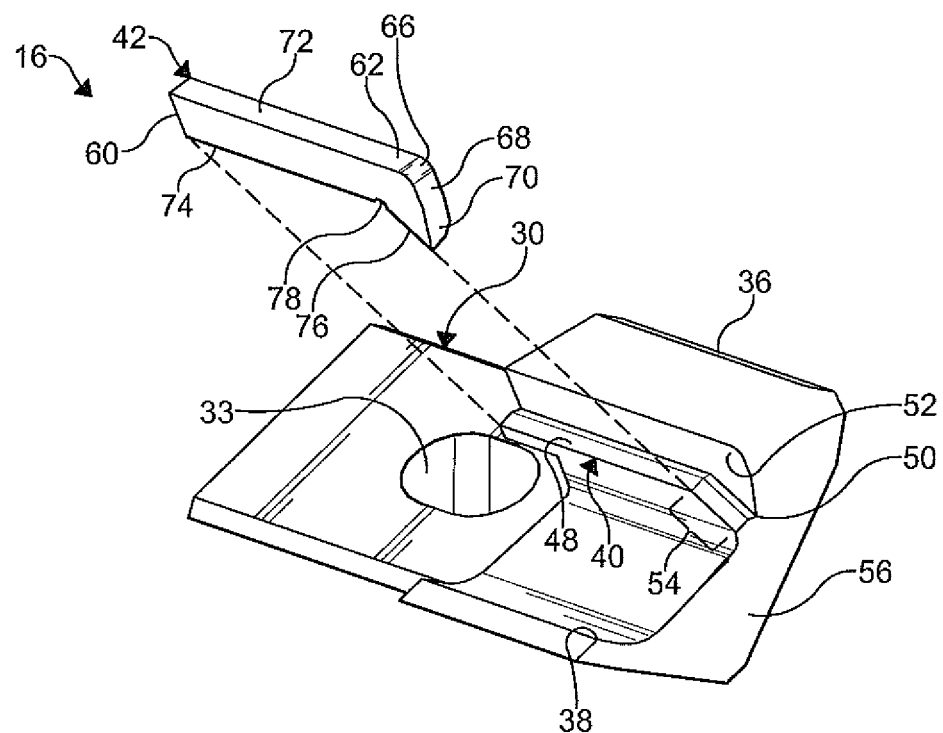
FIG. 2 is a front perspective view of the cartridge illustrated in FIG. 1 according to an embodiment of the invention, showing a cutting insert exploded from the cartridge.
Figure 3:
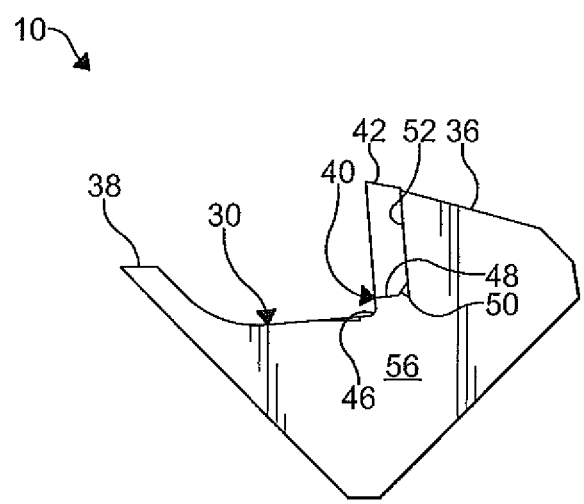
FIG. 3 is a front elevational view of the cartridge illustrated in FIGS. 1 and 2.

Referring now to FIGS. 2-3, one of the cartridges 16 according to the present invention is shown. The cartridge 16 includes a cutting head 36 having a cutting chip control portion 38 and a universal pocket 40. The cutting chip control portion 38 has a generally arcuate shape to direct abrasive cutting chips away from the cutter body 12 and militate against a flow of the abrasive cutting chips over the cutter body 12 during use of the cutting tool 10. As such, the cutting chip control portion 38 of the cutting head 36 minimizes wear and damage to the cutter body 12, thereby increasing a life of the cutting tool 10.

The universal pocket 40 of the cutting head 36 is configured to receive a cutting insert 42. In certain embodiments, the cutting insert 42 is secured to the cutting head 36 by brazing, for example. Various other means can be employed to couple the cutting insert 42 to the cutting head 36 as desired. The universal pocket 40 is formed in the cutting head 36 to positively locate the cutting insert 42 relative to the cartridge 16. As such, a position of the cutting insert 42 relative to the cartridge 16 is controlled during the brazing process to militate against misalignment thereof. The universal pocket 40 is also configured to retain a variety of cutting inserts 42 having different lengths. Therefore, the universal pocket 40 permits the cartridge 16 to be employed for various depths of cut.

In certain embodiments, the universal pocket 40 is defined by a shoulder formed by a substantially planar first surface 46 and a substantially planar second surface 48, a clearance recess 50, and a substantially planar third surface 52. As shown, the first surface 46 faces towards the cutting chip control portion 38 of the cutting head 36 and extends substantially parallel to the longitudinal axis thereof. The second surface 48 is substantially perpendicular to the first surface 46 and extends substantially parallel to the longitudinal axis of the cutting head 36. The clearance recess 50 is formed between the shoulder and the substantially planar third surface 52 to permit the cutting insert 42 to be positioned relative to the cartridge 16. The recess 50 extends substantially parallel to the longitudinal axis of the cutting head 36. As illustrated in FIG. 2, a portion 54 of the first surface 46 and the recess 50 is angled with respect to the longitudinal axis of the cutting head 36 and the first surface 46 towards a first cutting end 56 of the cutter body 12.

As more clearly shown in FIG. 2, the cutting insert 42 is configured to be received in the universal pocket 40. In certain embodiments, the cutting insert 42 is formed of a polycrystalline diamond material. For example, the cutting insert 42 may be formed of a polycrystalline diamond composite material backed with cemented tungsten carbide by sintering together selected synthetic diamond particles at high temperature and pressure in the presence of a solvent/catalyst metal. As shown, the cutting insert 42 includes a first end 60 and a second end 62. The first end 60 includes a substantially planar surface (not shown) and the second end 62 includes a nose radius 66, a substantially planar wiper surface 68, and a substantially planar relief surface 70. In certain embodiments, the nose radius 66 is in a range of about 0.005 mm to about 3.0 mm and the wiper surface 68 is in a range of about 0.0 mm to about 0.15 mm. A substantially planar outer surface 72 extends between the first end 60 and the second end 62. It is understood that a length of the outer surface 72, also known as a depth of cut (DOC), can be any suitable length as desired. In certain embodiments, the length of the outer surface 72 or DOC is in a range of about 0.200 mm to about 0.75 mm. A substantially planar first inner surface 74 and a substantially planar second inner surface 76 extend between the first end 60 and the second end 62. The second inner surface 76 is angled with respect to the longitudinal axis of the cutting head 36 to cooperate with the portion 54 of the first surface 46 of the cutting head 36. A clearance recess 78 is formed between the first inner surface 74 and the second inner surface 76 to permit the cutting insert 42 to be received in the universal pocket 40. It is understood that the cutting insert 42 can have any suitable dimensions as desired.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A cutting tool, comprising:
   a cutter body including at least one pocket formed therein; and
   a cutting tool cartridge configured to be received in the at least one pocket of the cutter body, the cutting tool cartridge including a main body, wherein the main body includes a cutting head having a pocket configured to receive a cutting insert, wherein the pocket of the cutting head includes a shoulder and a recess formed between the shoulder and a substantially planar surface, wherein the shoulder and the substantially planar surface cooperate to position the cutting insert relative to the cutting tool cartridge, wherein the at least one pocket of the cutter body is a V-shaped pocket configured to receive one of a right handed cutting tool cartridge and a left handed cutting tool cartridge.

2. The cutting tool of claim 1, wherein the shoulder extends substantially parallel to a longitudinal axis of the main body.

3. The cutting tool of claim 1, wherein the shoulder is formed by a substantially planar first surface and a substantially planar second surface.

4. The cutting tool of claim 3, wherein a portion of one of the first surface and the second surface of the shoulder is angled with respect to a longitudinal axis of the main body.

5. The cutting tool of claim 1, wherein the cutting head includes a cutting chip control portion.

6. The cutting tool of claim 1, wherein the cutting insert includes at least one of first end and a second end, the second end having a nose radius, a wiper surface, and a relief surface.

7. The cutting tool of claim 1, wherein the cutting insert includes at least one of a substantially planar outer surface, a substantially planar first inner surface, and a substantially planar second inner surface.

8. The cutting tool cartridge of claim 1, wherein the cutting insert is formed from a polycrystalline diamond material.

9. The cutting tool cartridge of claim 1, wherein the cutting insert is secured to the cutting head.

10. The cutting tool cartridge of claim 1, wherein the cutting insert is secured to the cutting head by brazing.

11. A cutting tool, comprising:
    a cutter body including at least one pocket formed therein; and
    a cutting tool cartridge configured to be received in the at least one pocket of the cutter body, the cutting tool cartridge including a main body, wherein the main body includes a cutting head having a cutting chip control portion and a pocket configured to receive a cutting insert, wherein the pocket of the cutting head is defined by a shoulder formed by a substantially planar first surface and a substantially planar second surface, a clearance recess, and a substantially planar third surface, and wherein a portion of one of the first surface and the second surface of the shoulder is angled with respect to a longitudinal axis of the main body.

12. The cutting tool of claim 11, wherein the cutting insert includes a first end, a second end, a substantially planar outer surface extending between the first end and the second end, a substantially planar first inner surface, and a substantially planar second inner surface, and wherein the second inner surface is configured to cooperate with the angled portion of the second surface of the cutting head of the cutting tool cartridge.

13. The cutting tool cartridge of claim 11, wherein the cutting insert is formed from a polycrystalline diamond material.

14. The cutting tool cartridge of claim 11, wherein the cutting insert is secured to the cutting head.

15. The cutting tool cartridge of claim 11, wherein the cutting insert is secured to the cutting head by brazing.

16. A cutting tool cartridge, comprising:
a main body including a cutting head having a pocket configured to receive a cutting insert, wherein the pocket includes a shoulder and a recess formed between the shoulder and a substantially planar surface, wherein the shoulder and the substantially planar surface cooperate to position the cutting insert relative to the cutting tool cartridge, wherein the shoulder is formed by a substantially planar first surface and a substantially planar second surface, and wherein a portion of one of the first surface and the second surface of the shoulder is angled with respect to a longitudinal axis of the main body.

17. The cutting tool cartridge of claim 16, wherein the cutting insert is formed from a polycrystalline diamond material.

18. The cutting tool cartridge of claim 16, wherein the cutting insert is secured to the cutting head.

19. The cutting tool cartridge of claim 16, wherein the cutting insert is secured to the cutting head by brazing.

20. A cutting tool cartridge, comprising:
a main body including a cutting head having a pocket configured to receive a cutting insert, wherein the pocket includes a shoulder and a recess formed between the shoulder and a substantially planar surface to position the cutting insert relative to the cutting tool cartridge, wherein the substantially planar surface is substantially parallel to a central longitudinal axis of a cutter body in which the cutting tool cartridge is configured to be disposed, and wherein the main body has a generally triangular cross-sectional shape.

* * * * *